United States Patent
Brouns et al.

(10) Patent No.: US 6,224,998 B1
(45) Date of Patent: May 1, 2001

(54) BATTERY, TRAY AND HEAT SHIELD ASSEMBLY

(75) Inventors: Daniel Robert Brouns, McCordsville; Harry Daniel Mc Vey, Pendleton; Burdis H. Litton, Anderson, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/243,947

(22) Filed: Feb. 4, 1999

(51) Int. Cl.[7] .................................................. H01M 2/00
(52) U.S. Cl. ............................ 429/100; 429/96; 429/163
(58) Field of Search .............................. 429/96, 97, 98, 429/100, 163, 175, 166, 177, 121, 122, 151, 153, 155, 176

(56) References Cited

U.S. PATENT DOCUMENTS 4,350,746 * 9/1982 Chambers ............................. 429/121
4,756,978 * 7/1988 Nitcher et al. ........................... 429/1
5,660,945 * 8/1997 McCormick et al. ............... 429/123

* cited by examiner

Primary Examiner—Stephen Kalafut
Assistant Examiner—M. Wills
(74) Attorney, Agent, or Firm—Margaret A. Dobrowitsky

(57) ABSTRACT

An electrical storage battery is supported on a tray which is secured to a frame member. The tray and battery have interlocking notches which maintain the battery relative to the tray. A heat shield is positioned to cover the battery and secured to the tray. The securement structure includes a slot in the tray, retaining tab on the heat shield and a retaining clip. The retaining tab is inserted in the slot in the tray. The retaining clip passes through a slot on the heat shield and engages the slot in the tray to restrict movement of the retaining tab. The periphery of the heat shield is supported on three sides in grooves on the tray.

4 Claims, 4 Drawing Sheets

BATTERY, TRAY AND HEAT SHIELD ASSEMBLY

TECHNICAL FIELD

This invention relates to a battery subsystem having apparatus for securing an electrical storage battery in a tray and for protecting the battery from the environment.

BACKGROUND OF THE INVENTION

Electrical storage batteries, particularly those used in vehicles, are supported in a tray which is secured by fasteners to the frame of the vehicle. The battery is secured on the frame by brackets, tie-bars and fasteners. A heat shield is often installed over the battery to provide thermal protection from the environment in the engine compartment of the vehicle.

During installation in a vehicle, the tray is secured to the frame by fasteners which require the use of tools. The battery is then placed in the tray and secured thereto by various structures such as holddown brackets. These structures also require fasteners and tools for the assembly. Often, the tools used for the frame attachment and the battery holddown attachment are not the same or the battery is installed at a different point during the assembly thereby requiring a larger inventory of tools.

The heat shield can be attached to the battery prior to installation or at a later time. If the heat shield is attached later, more tool and fasteners are required. The complete subsystem comprised of the tray, the battery, the heat shield and brackets can consist of four or more components and the use of two or more fasteners. The installation process is time consuming and, depending on the battery location in the engine compartment, can be very awkward.

SUMMARY OF THE INVENTION

It is an object of the present invention to provide an improved battery subsystem and assembly thereof.

In one aspect of the present invention, a toolless battery subsystem is provided. In another aspect of the present invention, a battery subsystem that is quickly and easily installed in and removed from a vehicle. In yet another aspect of the present invention, the battery tray has notches along opposite sides which intermesh with complementary members on the battery.

In still another aspect of the present invention, a heat shield cover and a retaining clip assist in positioning the battery on the tray. In a further aspect of the present invention, the heat shield has a tab which passes through a slot in the tray to position the heat shield thereon. In a yet further aspect of the present invention, the heat shield has an outer rim which is positioned in a slot on the tray. In a still further aspect of the present invention, the retaining clip is positioned to prevent inadvertent removal of the tab from the slot.

DESCRIPTION OF AN EXEMPLARY EMBODIMENT

Figure 1:
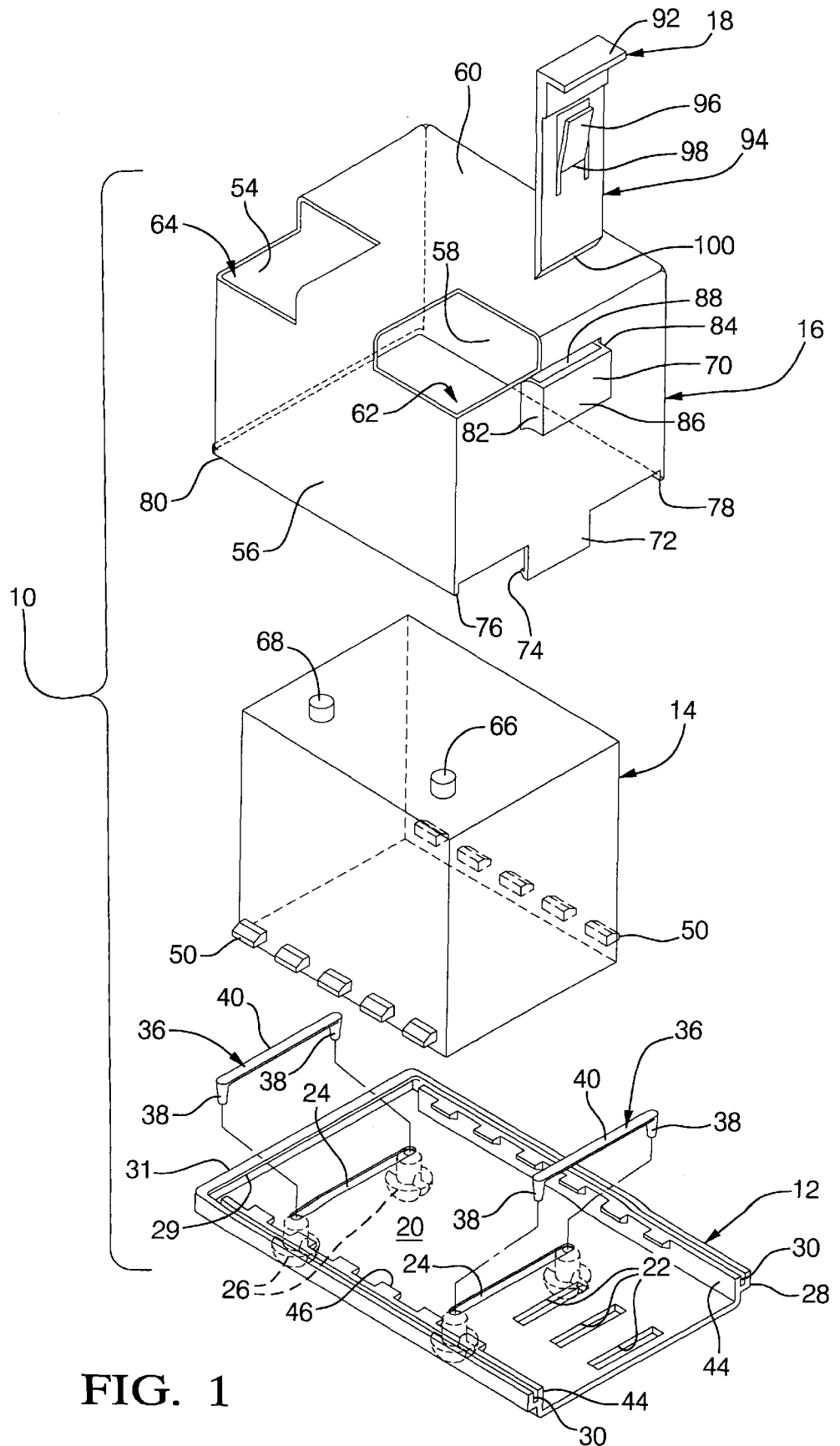
FIG. 1 is an exploded view of a battery subsystem incorporating the present invention.
Figure 2:
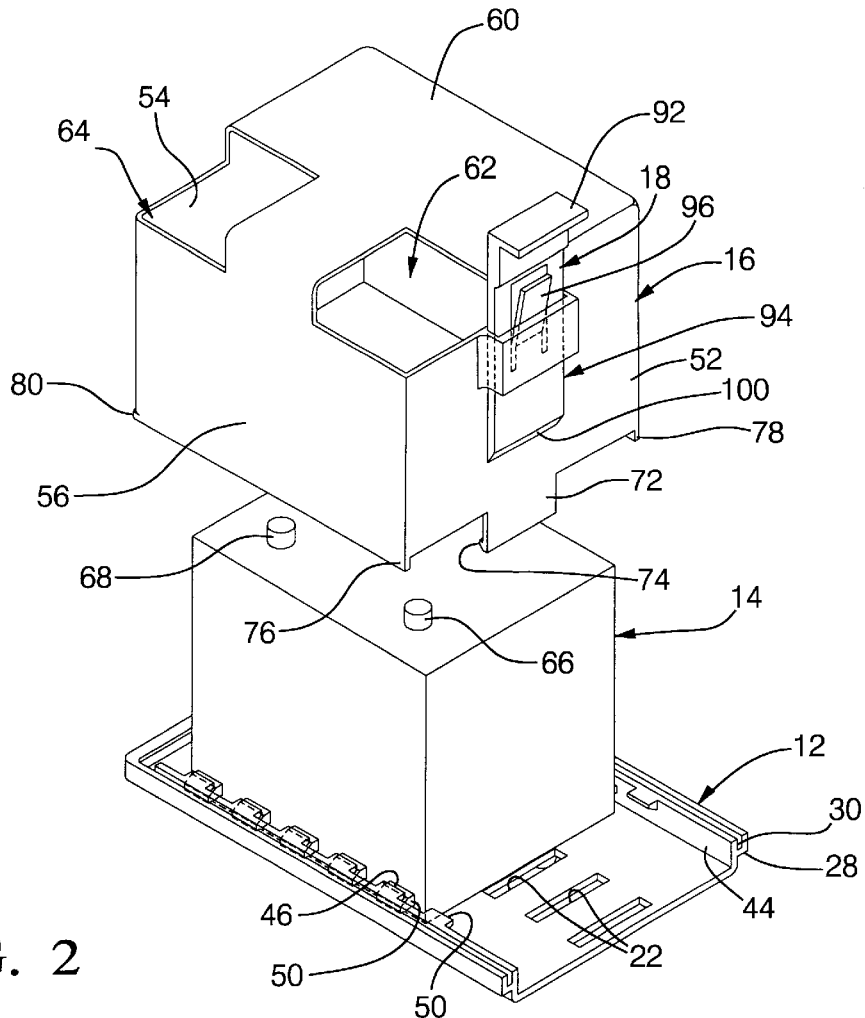
FIG. 2 is an exploded view of the battery subsystem in a partially assembled condition.

Referring to the drawings wherein like characters represent the same or corresponding part throughout the several views, there is seen in FIG. 1 a battery subsystem 10 having a tray 12, a battery 14, a heat shield 16 and a retaining clip 18. The tray 12 has a bottom surface or wall 20 having a plurality of slots 22, and a pair of recesses 24. Tray lock pads 26 are integrally formed on the outer surface of the tray 12. The tray 12 has rims 28 on opposite sides of the tray 12 and a lip or shelf 29 formed on an end wall 31. A slot 30 is formed in each of the rims 28.

Figure 3:
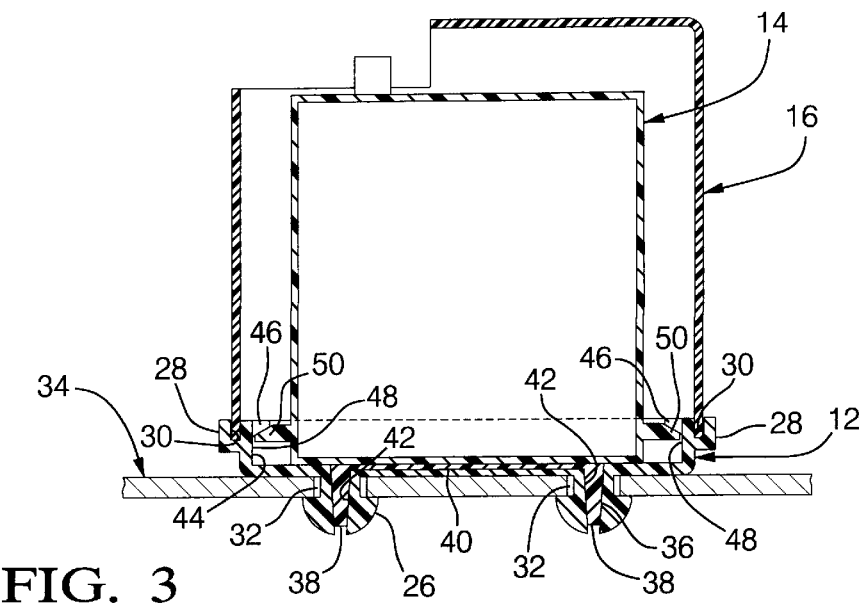
FIG. 3 is a sectional side elevational view of the assembled battery subsystem.
Figure 4:
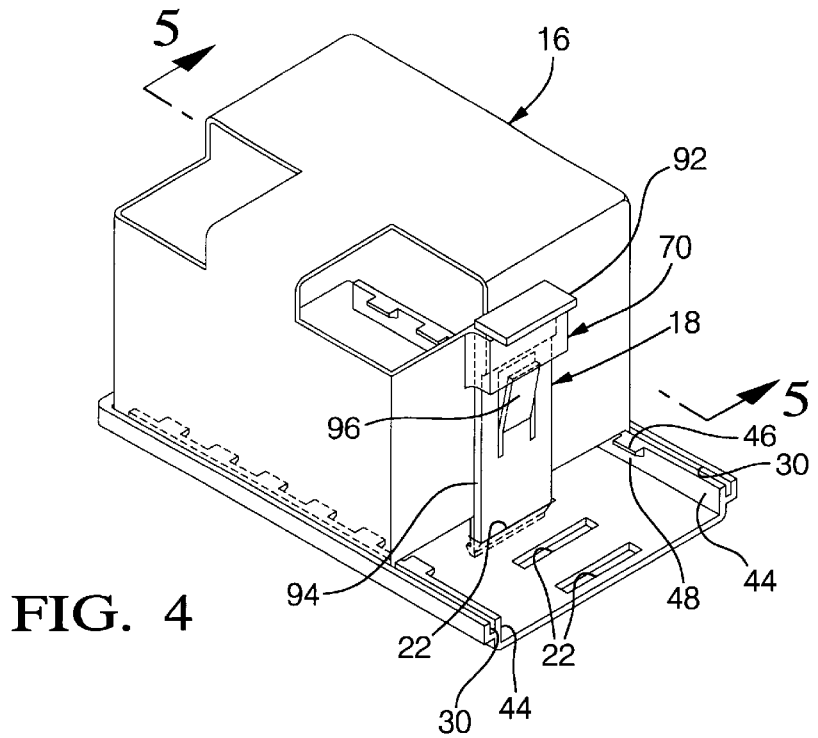
FIG. 4 is an isometric view of the tray, heat shield and retaining clip as assembled.
Figure 5:
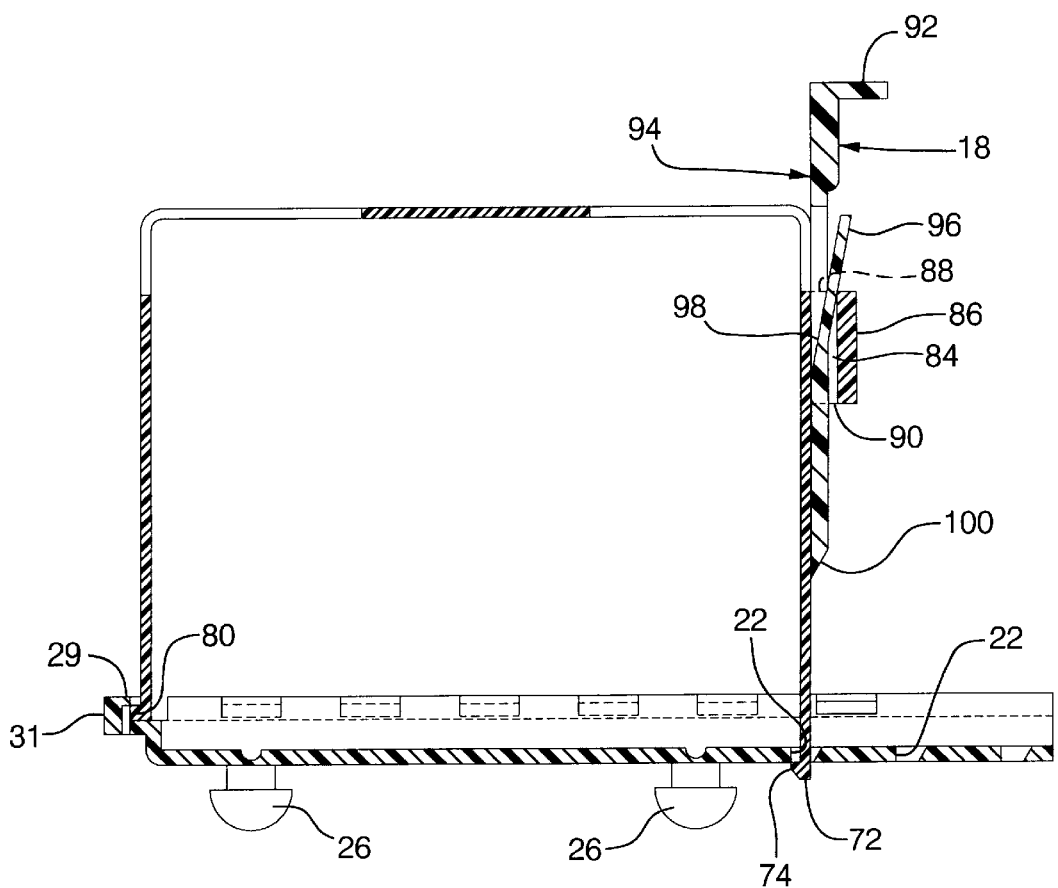
FIG. 5 is a view taken along line 5—5 in FIG. 4 showing the retaining clip partially installed.
Figure 6:
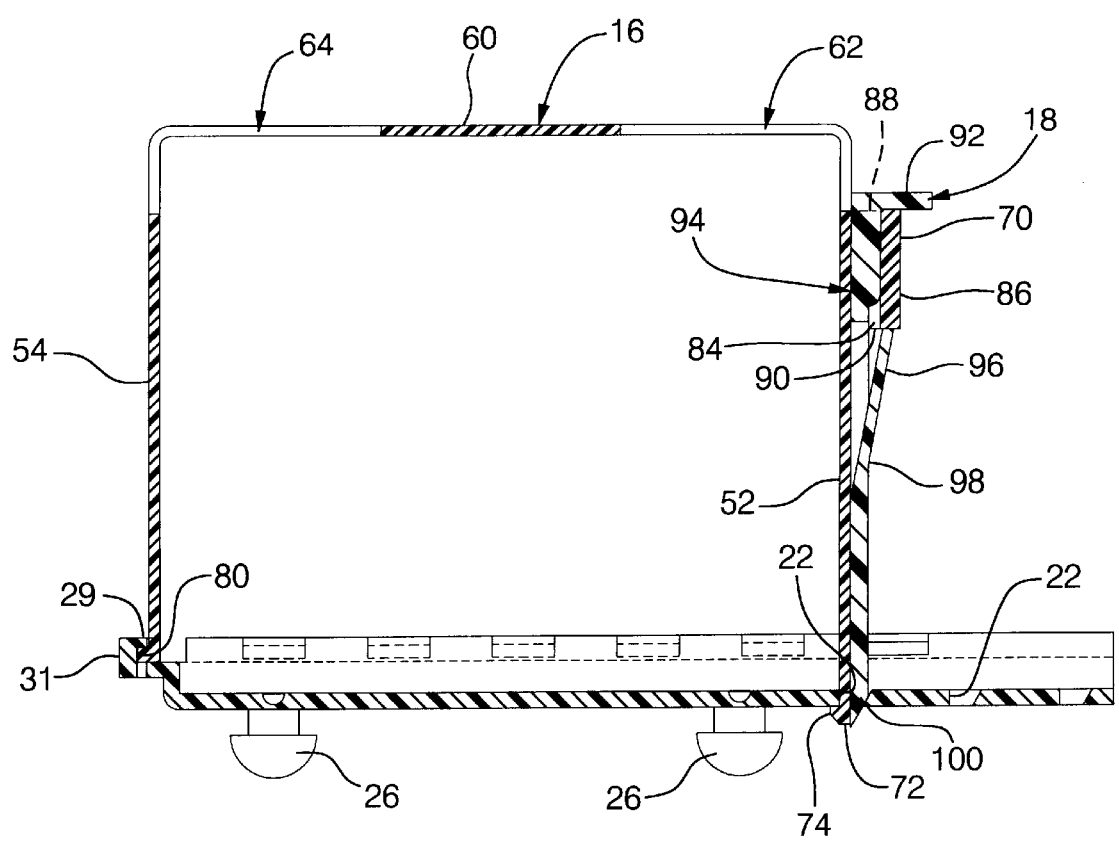
FIG. 6 is a view similar to FIG. 5 showing the retaining clip fully installed.

The slots 22 extend through the bottom wall 20 while, as seen in FIG. 3, the recesses 24 do not. The lock pads 26 are adapted to be inserted through apertures 32 in a frame 34. An insert 36 having a pair of spaced pegs 38 joined by a strap 40 is employed to assist in securing the tray 12 to the frame 34. Each lock pad 26 has a central channel 42 in which respective ones of the pegs 38 are inserted. During insertion of the pegs 38, the straps 40 are disposed in the respective recesses 24 and do not protrude above the bottom wall 20.

Each rim 28 has an interior surface 44 from which a plurality of spaced tabs 46 protrude. A notch 48 is formed between each tab 46 and the bottom wall 20. The tabs 46 cooperate with spaced tabs 50 formed on the battery 14 to aid in positioning the battery on the tray 12. The tabs 50 have a width which is slightly less than the space between the tabs 46. The space between the tabs 50 is substantially equal to the space between the tabs 46. The battery 14 is placed on the tray 12 such that the tabs 46 and 50 are not aligned. The battery 14 is moved along the tray 12 toward the end wall 31 until the tabs 46 and 50 are in substantial vertical alignment with the tabs 50 disposed in respective notches 48.

The heat shield 16 has a pair of side walls 52 and 54, a front wall 56, a rear wall 58 and a top wall 60. Two of the corners 62 and 64 are removed to accommodate access to the terminals 66 and 68 respectively of the battery 14. A pocket 70 is integrally formed on the side wall 52 and a tab 72 aligned vertically with said pocket 70 depends from the lower edge of the side wall 52. The tab 72 has a tooth 74 formed thereon. The front wall 56 and the rear wall 58 have rim portions 76 and 78 respectively which extends below the side wall 52. The side wall 54 has a lip 80 which extends outwardly therefrom and is substantially aligned with the rims 76 and 78. The pocket 70 has two side wall 82 and 84 and an outer wall 86. The pocket 70 is open to the interior of the heat shield 16 and has upper and lower openings 88 and 90 respectively.

The clip 18 has a handle or lip portion 92 and a body portion 94. A locking tab 96 is formed integrally with the body portion 94. The tab 96 is connected with the body portion through a living hinge 98 so to be flexible. The hinge 98 urges the tab 96 outwardly from the body 94. Prior to assembly of the heat shield 16 onto the tray 12, the clip is disposed in the pocket 70 through the upper and lower openings 88 and 90.

At assembly of the battery subsystem 10, the tray 12 is installed on the frame 34, as seen in FIG. 3, by inserting the pads 26 through respective apertures 32. The insert 36 is installed with the pegs 38 disposed in respective channels 42. The battery 14 is placed on the tray 12 with the tabs 50 being positioned between the tabs 46 on the tray 12. The battery 14 is then moved or slid on the tray 12 until the battery is substantially adjacent the end 31 and the tabs 50 are aligned in respective notches 48. The heat shield 16 is installed over the battery with the lip 80 being positioned under the shelf 29 and the rims 76, 78 being disposed in the slots 30. The tab 72 is inserted in one of the slots 22 such that the tooth 74 is below the bottom wall 20 of the tray 12. The clip 18 is then pushed downward in the pocket 70—until a tapered end 100 engages the same slot 22 as the tab 72 on the clip 18. This will force the tooth 74 to engage the underside of the bottom wall 20 of the tray 12 thereby securing the subassembly 10 in position. The locking tab 96 will be urged outwardly from the body 94 after passing through the pocket 70 to engage the lower surface of the outer wall 86. This will prevent inadvertent removal of the clip 18 from the pocket 70.

From the above description, it will be obvious to those skilled in the art that the installation of the battery subsystem 10 on the frame 34 is a toolless operation. Which is performed with simplicity by a single assembler. The disassembly is simply a reverse of the assembly such that replacement of the battery 14, if necessary, is also toolless.

What is claimed is:

1. A battery subsystem secured to a frame comprising:
   a tray having a bottom wall with a slot formed therein locking pads depending therefrom and being inserted in respective apertures in the frame and said tray including at least three side walls with two of said side walls each having an upwardly opening slot and a third of said side wall having an inwardly facing shelf, said two side walls each having a plurality of inwardly facing spaced tab members disposed upwardly from said bottom wall;
   a battery having a pair of opposed walls with a plurality of tab members extending from each wall and being aligned with respective tabs on said tray;
   a shield covering said battery having a first wall including a lip engaged under said shelf on said tray, a second wall and a third wall each having a rim portion disposed in respective ones of said upwardly opening slots on said tray and a fourth wall having a tab portion engaged said slot in said bottom wall and a pocket formed on said fourth side wall substantially vertically aligned with said tab portion; and
   a clip slidably disposed in said pocket having a body portion with an end thereof positioned in said slot in said bottom wall adjacent said tab portion on said fourth wall of said shield, a locking tab resiliently formed on said body portion and being urged into engagement with a lower surface of said pocket to retain said clip an said pocket.

2. The battery subsystem defined in claim 1 further comprising:
   a recess formed in the bottom wall of said tray overlapping and extending between a pair of said locking pads, each locking pad having a central channel; and
   an insert having a strap portion disposed in said recess and a pair of pegs inserted in respective ones of said channels in said locking pads for assisting in retaining said locking pads in the apertures in the frame.

3. A battery subsystem comprising:
   a tray for supporting a battery, said tray comprising an end wall having a shelf formed thereon, a pair of opposed walls each having a longitudinal slot formed therein and a plurality of spaced transverse slots formed in a bottom wall;
   a protective cover having a first wall with a lip formed integrally thereon, said lip being disposed in alignment with said shelf, a second wall having a rim disposed in said slot in one of said opposed walls, a third wall having a rim disposed in said slot in the other of said opposed walls, a fourth wall having a tab extending through one of said slot in said bottom wall and a pocket formed on said fourth wall in vertical alignment with said tab; and
   a latching clip having a body portion extending through said pocket and engaging the same slot through which the tab extends, and a latching tab disposed for abutment with a portion of said pocket between said tab and said pocket.

4. The battery subsystem defined in claim 3 further comprising:
   said tab having a tooth formed thereon adapted to engaged an underside of said tray and said body of said clip having a tapered lower edge engaged in said slot to force said tooth into alignment with said undersurface and thereby prevent inadvertent removal of said tab from said slot.

\* \* \* \* \*